United States Patent [19]

Kiesewetter et al.

[11] Patent Number: 5,455,341

[45] Date of Patent: Oct. 3, 1995

[54] HIGHLY SUBSTITUTED CARBOXYMETHYL SULFOETHYL CELLULOSE ETHERS (CMSEC), A PROCESS FOR THEIR PRODUCTION AND THEIR USE IN TEXTILE PRINTING

[75] Inventors: René Kiesewetter, Soltau-Ahlften; Reinhard Kniewske, Fallingbostel; Eugen Reinhardt, Walsrode; Klaus Szablikowski, Walsrode, all of Germany

[73] Assignee: Wolff Walsrode Aktiengesellschaft, Walsrode, Germany

[21] Appl. No.: 160,709

[22] Filed: Dec. 1, 1993

[30] Foreign Application Priority Data

Dec. 8, 1992 [DE] Germany .......................... 42 41 289.7

[51] Int. Cl.$^6$ .......................... C08B 15/04; C09D 11/14
[52] U.S. Cl. .................. 536/90; 536/92; 536/97; 536/98
[58] Field of Search .................. 536/90, 92, 97, 536/98; 8/528, 445, 559, 562

[56] References Cited

U.S. PATENT DOCUMENTS

| | | | |
|---|---|---|---|
| 4,426,206 | 1/1984 | Hosokawa et al. .......................... | 8/528 |
| 4,972,007 | 11/1990 | Herzog et al. .......................... | 523/130 |
| 5,001,232 | 3/1991 | Herzog et al. .......................... | 536/90 |
| 5,177,199 | 1/1993 | Kiesewetter et al. ...................... | 536/90 |

FOREIGN PATENT DOCUMENTS

| | | |
|---|---|---|
| 0319868 | 6/1989 | European Pat. Off. . |
| 0319865 | 6/1989 | European Pat. Off. . |

OTHER PUBLICATIONS

Chemical Abstract, vol. 110, No. 2, Jan. 9, 1989, JP 63182301, Abs. #9963P; "Salt–resistant cellulose ether sodium salts and . . . " F. Takahashi et al.

Chemical Abstract, vol. 94, No. 18, May 4, 1981, Abs. #141132X; "Composition for Printing on Textile Materials made of acetate . . . ", L. I. Gandurin et al.

Database WPI, Derwent Publications, AN 74–21656V, Week 7412, JP 48027985, Sanyo Kokisaku Pulp Co. Apr. 13, 1973; "Drilling mud modifier with high . . . ".

*Primary Examiner*—Nathan M. Nutter
*Attorney, Agent, or Firm*—William C. Gerstenzang; Sprung Horn Kramer & Woods

[57] ABSTRACT

The invention relates to certain highly substituted carboxymethyl sulfoethyl cellulose ethers (CMSEC), to a simplified and economic process for their production and to their use as thickeners in textile printing.

9 Claims, No Drawings

HIGHLY SUBSTITUTED CARBOXYMETHYL SULFOETHYL CELLULOSE ETHERS (CMSEC), A PROCESS FOR THEIR PRODUCTION AND THEIR USE IN TEXTILE PRINTING

This invention relates to certain highly substituted carboxymethyl sulfoethyl cellulose ethers (CMSEC), to a simplified and economic process for their production and to their use as thickeners in textile printing.

In the context of the invention, the expression "highly substituted" applies to all those products which have an average total degree of substitution of at least 1.0, more particularly 1.4 and preferably at least 1.6, but of which the total degree of substitution should be below 2.2. The degree of substitution by sulfoethyl groups is <0.6 and, more particularly, <0.4.

Cellulose derivatives, more particularly carboxymethyl celluloses (CMC), are used in various applications as thickeners and dispersants, carrier materials and hydrocolloids in the production of pharmaceuticals, foods and cosmetics (see, for example, K. Balser in: Ullmanns Encyclopädie der Technischen Chemie, 4th Edition, Vol. 9, Verlag Chemie, Weinheim, 1975, page 208; K. Balser, K. Szablikowski: Papier [Darmstadt] 35 [1981] 578; W. Burchardt: Polysaccharide, Springer Verlag, Berlin-Heidelberg 1985, 126 et seq., 171 et seq.).

In general, the CMC's have degrees of substitution of 0.4 to 1.2 (see, for example, G. I. Stelzer, E. D. Klug in R. L. Davidson, Handbook of Water Soluble Gums and Resins, Chapter 4, page 3, McGraw Hill, New York, 1980). However, extremely highly substituted products of particularly high solubility are required for special applications.

One example of such an application is the use of CMC as a thickener for printing inks in the printing of textiles, for example with reactive dyes.

According to DE 32 08 430 C2, only those carboxymethyl celluloses which have degrees of substitution of at least 2.2 and preferably of at least 2.5 can be used in the printing of textiles, for example with reactive dyes. Poor removability by washing and hardening of the printed areas are said to be avoided in this way.

However, the alkalization and etherification step has to be repeated several times for highly substituted products such as these, necessitating complex and expensive production processes so that—regarded over several stages—the substitution yields are very poor (DE-OS 33 03 153; M Rinaudo, G. Hudry-Clergeon, J. Chim. Phys. 64, 1746 [1967]; J. W. Green, R. L. Whistler, Methods in Carbohydrate Chemistry, Vol. 3, Cellulose, page 324, Academic Press, New York/London, 1963).

Semi-dry processes are often favored for economic reasons. However, corresponding reactions still lead to solutions of poor quality, even with extremely highly etherified products (see, for example, R. R. McLaughlin, J. H. E. Herbst, Can. J. Res., 28 B, 731 et seq., 737 et seq. [1950]).

The problem addressed by the present invention was to provide an economic and industrially workable process for the production of highly substituted sulfoalkyl cellulose derivatives characterized by excellent solution quality. More particularly, the invention sought to provide products which could be used as thickeners in textile printing, even with degrees of substitution of <2.2. The disadvantages of carboxymethyl celluloses used with degrees of substitution of <2.2, more particularly hardening of the substrate (textile fabric), would be avoided.

It has now surprisingly been found that sulfoalkyl cellulose derivatives, more particularly carboxymethyl sulfoethyl cellulose ethers (CMSEC) having average total degrees of substitution of >1.0, preferably 1.4 and, more preferably, >1.6 and <2.2 and degrees of sulfoethyl substitution of <0.6 and, more particularly, <0.4 overcome the disadvantages of the prior art. The simple and economic production process is characterized by the following features:

a) Reaction of reagents transferring sulfoethyl and/or carboxymethyl groups with alkali cellulose by a slurry process to a total degree of substitution of approx. 0.7 to approx. 0.95. The etherification reagents are reacted together, but preferably one after the other. More particularly, the reaction initially takes place with reagents transferring sulfoethyl groups, the reagent being added to the slurry medium in particular before the alkali.

b) The quantity of slurry medium is optionally reduced and the carboxymethyl, sulfoethyl or carboxymethyl sulfoethyl cellulose prepared in the first reaction step is further etherified in a second reaction step carried out without preliminary purification or preliminary grinding by addition of more etherification reagents to total degrees of substitution DS of >1.0, preferably >1.4 and, more preferably, >1.6, but <2.2. The degree of substitution by sulfoethyl groups is <0.6 and, more particularly, <0.4.

c) Separation, optionally complete or partial removal of secondary reaction products by purification with preferably aqueous/organic solvents, followed by drying, grinding and making up of the resulting sulfoethyl cellulose derivative in the usual way.

The carboxymethyl sulfoethyl cellulose produced by the process described above may be used as a thickener for textile printing inks and is largely inert to the reactive dye present in the printing ink so that the feel of the printed substrate is not hardened in any way.

Ionic cellulose mixed ethers bearing a sulfoalkyl substituent and, more particularly, a sulfoethyl substituent, more especially carboxymethyl sulfoethyl celluloses, are described in the patent literature.

U.S. Pat. No. 2,132,181 describes a process for the production of polysaccharide compounds. The ionic cellulose mixed ethers are prepared in several stages, alkalization taking place in a first reaction step (mash alkalization). The subsequent etherification with sodium vinyl sulfonate and methyl chloride, ethyl chloride, ethylene oxide or chloroacetic acid is carried out in one or two stages. The reaction with sodium vinyl sulfonate is preferably carried out in a kneader. Extremely large excesses of alkali are used in this process which, on the one hand, leads to significant secondary reactions and, on the other hand, makes the production of these products extremely uneconomical. In addition, experience has shown—as mentioned above—that reactions in a laboratory kneader always lead to poor solution quality, i.e. high fiber and gel contents.

The water-soluble cellulose mixed ethers described in DE-OS 31 47 434, DE-A 33 06 621, DE-OS 33 16 124 and DE-OS 34 17 952 are inter alia ionic cellulose mixed ethers bearing methyl, carboxyalkyl and sulfonoalkyl groups. The products in question, which are not described in any detail in regard to their viscosity, their degree of substitution, their yield or their solution quality, are prepared either in dimethylether or dimethoxyethane alone or together with alkanols, alkanediois and/or alkoxyalkanols.

The production of carboxymethyl sulfoethyl cellulose ethers (CMSEC) with total degrees of substitution of <2.8 (DS sulfoethyl=0.15 to 0.3; DS carboxymethyl=0.25 to 2.5) is claimed in U.S. Pat. No. 2,811,519. The etherification reaction is preferably carried out by the simultaneous addition of reagents transferring carboxymethyl groups and reagents transferring sulfoethyl groups. The object of this is to provide products characterized by very good salt and acid stability by an inexpensive process. However, the CMSEC's show extremely low viscosities attributable to the process, but are distinguished by very good solution, salt and acid stability. The products mentioned by way of example, which have low degrees of substitution and which cannot therefore be used in textile printing, have total degrees of substitution of well below 1.0 which is consistent with the fact known from the literature that, in carboxymethylation reactions, degrees of substitution of only up to about 1.0 are generally obtained in single-stage etherification processes (see, for example, K. Engelskirchen in: Houben-Weyl "Makromolekulare Stoffe", Vol. E 20/III, page 2074, edited by A. Barth and J. Falbe, Georg-Thieme-Verlag, Stuttgart/New York, 1987).

The use of CMSEC as a thickener for printing inks for printing textiles of acetate or viscose fibers, natural or synthetic polyamide fibers is described in SU 794 098. The CMSEC claimed in this document has degrees of substitution by sulfoethyl groups of 0.1 to 0.25 and degrees of substitution by carboxymethyl groups of 0.4 to 0.55 and, hence, shows a similar substitution pattern to the CMSEC's mentioned by way of example in U.S. Pat. No. 2,811,519. The object of using a CMSEC with such a low degree of substitution in textile printing is to increase the intensity of color and the viscosity and to improve the homogeneity of the printing mixture. However, an improvement in the feel of the printed material is only possible in the case of products where the primary OH groups in the $C_6$ position of the cellulose are largely blocked which cannot be the case with the CMSEC's mentioned on account of their low total degree of substitution (see also DE 32 08 430 C2 and the Comparison Example further below). In addition, the described CMSEC's show very poor solution quality. The transmission of a 0.5% aqueous solution is only 89.5%, which is indicative of a very high fiber content of the solutions. In textile printing, products such as these lead very quickly to blockage of the screens, gauze or rotary screens. Defective prints are the inevitable outcome. Accordingly, the CMSEC mentioned does not lead to any improvement over the prior art.

CMSEC's characterized by very good solution quality can be produced in accordance with DE-OS 37 42 106. The average total degree of substitution satisfies the following formula:

$$0.5 \leq DS\ sulfoethyl + DS\ carboxymethyl \leq 1.6,$$

where the degree of substitution by sulfoethyl groups is 0.1 to 1.0 and the degree of substitution by carboxymethyl groups is 0.3 to 1.2. The products may be used as thickeners or water-retaining agents in the field of petroleum and building materials and as thickeners or stabilizers in detergents and cosmetics. In addition, CMSEC is suitable as a dispersion and suspension medium and as an auxiliary and thickener in aqueous systems, for example as a stabilizer, dispersion and suspension medium for emulsion and suspension polymerizations.

The simple and inexpensive process according to the invention for the production of a CMSEC leads to products which, despite very low total degrees of substitution compared with the prior art, give improved textile printing results by comparison with the products normally used (alginate, CMC).

The CMSEC produced by the process according to the invention and characterized by the test described hereinafter is distinguished by excellent solution quality and may be used as a dispersant, binder or thickener or as a flow promoter in the textile industry, more particularly in textile printing. The CMSEC may be used in purified form, in semipurified form and in unpurified form, i.e. as a technical product. It forms gel-free and fiber-free solutions in water and has viscosities (after purification) in the range from 10 to 50,000 mPa.s (as measured on a 2% by weight aqueous solution at a shear rate D of 2.5 $s^{-1}$ at T=20° C. [rotational viscosimeter]).

To avoid defective prints, which can be caused by blockage of the screens, gauze or rotary screens, the cellulose derivative used in textile printing is tested for its transmission or rather its solubility in water before practical application. The CMSEC and CMC mentioned in the Examples have transmission values of >96% (Hitachi model 101 spectral photometer, Hitachi Ltd., Tokyo, Japan); glass cuvette with a 10 mm optical path length ($\lambda$=550 nm; 2% by weight solution in dist. water). Their solubility in water is >99.9%.

The carboxymethyl sulfoethyl celluloses produced in accordance with the invention are used as printing ink bases in textile printing. They are preferably used on their own, although they may also be used in admixture with other natural or semisynthetic printing ink bases typically used in textile printing, such as for example sodium alginate, starch, modified starches, guar, carob bean flour, gum arabic, starch gum, tragacanth gum, tamarind and/or cellulose ethers, more particularly carboxymethyl cellulose ethers of known quality, or in admixture with fully synthetic thickeners, such as for example polymer thickeners, in which case the quantity of the CMSEC claimed in accordance with the invention in the mixture should not be less than 10% because otherwise the advantage of the invention (salt stability, print quality) is lost.

Synthetic fibers, natural fibers, blended fabrics or regenerated cellulose may be used as the textile materials.

The dyes used include, for example, oxidation dyes, sulfur dyes, development dyes, wool dyes, chrome dyes, direct dyes, acid dyes, dispersion dyes, naphthol dyes, vat dyes, metal complex dyes, pigments or commercial products of a mixture of a coupling component of development dyes and a diazoamino compound, but especially reactive dyes.

The degree of carboxymethyl substitution is determined by method B of ASTM-D 1439-83 a, method B. The degree of substitution by sulfoethyl groups is determined by Ehrenberger/Gorbach titration with barium perchlorate against thorine (Ehrenberger/Gorbach: Methoden der organischen Elementar- und Spurenanalyse, Verlag Chemie, Weinheim, 1973, page 223). The necessary digestion is carried out by the Schöninger method (Heraeus Manual EW-F 1.6.1. [method 1]).

EXAMPLES

EXAMPLE 1

In a thermostatistically controllable reactor equipped with a suitable stirrer, 137 parts finely ground, bleached, refined linters cellulose (dry matter content: 94.8%) are dispersed under nitrogen in 2,193 parts isopropanol, 136.5 parts of a 30.5% aqueous solution of sodium vinyl sulfonate and 108 parts water and the resulting dispersion is stirred for 15 minutes. 89.6 Parts sodium hydroxide pellets are then added and the mixture is alkalized for 80 minutes at 25 to 30° C. The temperature is then increased to 75° C. over a period of 30 minutes and kept at that level for 150 minutes. 133 Parts of a 79.6% aqueous solution of monochloroacetic acid are added dropwise at the same temperature. After another 150 minutes at 75° C., the mixture is cooled to 25°–30° C., 76.8 parts sodium hydroxide pellets are added and the mixture is alkalized for 30 minutes at 25° to 30° C. 114 Parts of a 79.6% aqueous monochloroacetic acid are then added at 25° to 30° C. The temperature is then increased to 75° C. over a period of 30 minutes and etherification is carried out for 150 minutes at that temperature. The product is separated, freed from secondary reaction products with 70% methanol, dried and ground (grading curve: 100% ≦0.8 mm). The CMSEC thus obtained has a total degree of substitution of 1.82. The degree of substitution by sulfoethyl groups is 0.26 and the degree of substitution by carboxymethyl groups 1.56. The purified product has a viscosity of 7,500 mPa.s (2% by weight aqueous solution).

EXAMPLE 2

(Comparison Example 1)

In a thermostatically controllable reactor equipped with a suitable stirrer, 127 parts finely ground, bleached and refined linters cellulose (dry matter content: 95.2%) are dispersed under nitrogen in 2,193 parts isopropanol and 210 parts water. After the addition of 88 parts sodium hydroxide pellets, the mixture is alkalized for 80 minutes at 25° to 30° C. 130 Parts of an 80% aqueous solution of monochloroacetic acid are then added. The temperature is increased to 70° C. over a period of 30 minutes and etherification is carried out for 120 minutes at that temperature. Another 88 parts sodium hydroxide pellets are then added at that temperature, followed by the introduction of 130 parts monochloroacetic acid (80%) continuously for 20 minutes. After another 120 minutes at 70° C., the mixture is cooled to 25°–30° C.

The product is separated, purified with 70% methanol, dried in air and ground (grading curve: 100% ≦0.8 mm). The CMC has a degree of substitution of 1.73. The purified product has a viscosity of 19,000 mPa.s.

EXAMPLE 3

(Comparison Example 2 [SU 794 098])

In a thermostatically controllable reactor equipped with a suitable stirrer, 134 parts finely ground, bleached and refined lignocellulose (dry matter content: 95.2%) are dispersed under nitrogen in 2,193 parts of a 30.5% aqueous solution of sodium vinyl sulfonate and the resulting dispersion is stirred for 15 minutes. 78.6 Parts sodium hydroxide pellets are then added and the mixture is alkalized for 80 minutes at 25° to 30° C. The temperature is then increased to 75° C. over a period of 30 minutes and kept at that level for 120 minutes. 56 Parts of a 79.6% aqueous solution of monochloroacetic acid are then added dropwise at the same temperature. After another 120 minutes at 75° C., the mixture is neutralized with 61.4 parts acetic acid and subsequently cooled to 25°–30° C. The product is separated, purified with 70% methanol, dried and subsequently ground (grading curve 100% ≦0.8 mm). The CMSEC has a total degree of substitution of 0.61. The degree of substitution by sulfoethyl groups is 0.18 while the degree of substitution by carboxymethyl groups is 0.43. A 2% by weight solution has a viscosity of 13,500 mPa.s. The CMSEC (cf. SU 794 098) was found to have a transmission value of 95.8% and a solubility in water of 99.2%.

The product has a very high fiber and gel content and, accordingly, cannot be used as a thickener for printing inks in textile printing because it would block screens, gauzes and rotary screens.

To improve the solubility of the thickener in the printing of textile material, it is advisable to grind the products before use and to establish a grading curve of 100% ≦2.0, preferably ≦1.0 and, more preferably, ≦0.5 mm. The size-reducing process required is carried out by dry or wet grinding. Suitable mills are roller mills, ball mills, beater mills and centrifugal mills, jet mills or vibrating mills.

In the following Examples, the effect of a carboxymethyl sulfoethyl cellulose used in accordance with the invention as a thickener in textile printing is compared with that of a commercially available sodium alginate (Lamitex M 5, a product of Protan, Norway) and a carboxymethyl cellulose (CMC) produced by the one-stage process. Isoviscous solutions having a viscosity (aqueous solution) of approx. 30,000 mPa.s (Brookfield RVF, spindle 4, 20 r.p.m.) were compared.

The compositions of the stock thickeners prepared with alginate, CMSEC and CMC are shown in Table 1. The printing inks are obtained by mixing defined quantities of the particular stock thickener (90 parts) with defined parts of the dye (10 parts) and distilled water. A commercial reactive dye (Cibacron TUrkis PG3® [40%]) is used as the dye.

TABLE 1

| Composition of the stock thickeners | | | | |
|---|---|---|---|---|
| | Stock thickeners[1] | | | |
| Thickening constituents | A | B invention | C | D |
| Lamitex M 5[2] | 550 | — | — | 275 |
| CMSEC | — | 500 | — | — |
| CMC | — | — | 700 | 350 |
| Lyoprint AP ®[3] | 3 | 3 | 3 | 3 |
| Lyoprint RG ®[4] | 10 | 10 | 10 | 10 |
| Urea | 100 | 100 | 100 | 100 |
| Na$_2$CO$_3$ solution (1:4) | 75 | 75 | 75 | 75 |
| Permutit water | 262 | 312 | 112 | 187 |
| Total quantity | 1,000 g | | | |

[1]Quantities in parts by weight
[2]Lamitex M 5 contains 5 g/kg sodium hexametaphosphate (Calgon T) and 5 g/kg formalin (37%)
[3]Foam inhibitor, a product of BASF/Ludwigshafen
[4]Oxidizing agent, a product of BASF/Ludwigshafen Printing tests are carried out with the printing inks on cotton weft satin (mercerized, bleached) as the substrate. The textile material is dried for about 10 minutes at 102° to 105° C. (fixing with saturated steam [Mathis dryer]) and fixed by dry heat (hot air) (1 minute at 200° C. Mathis dryer). Washing out is carried out in three stages:

a) thorough cold rinsing, b) treatment near the boiling temperature (10 mins.), c) cold rinsing.

A 64-T-screen (rectangle) and an 8 mm diameter coating knife (magnet stage 3, speed stage 3) are used to evaluate strength, penetration, tone, feel and evenness (Zimmer flat film printing). A 68-T-test screen and an 8 mm diameter coating knife (magnet stage 3, speed stage 3) are used to evaluate sharpness. The results of the printing tests are set out in Table 2.

TABLE 2

Printing results; comparison with Lamitex M 5
(No. 1), fixing with saturated steam

| Print or printing ink | Stock Thickener | Strength[1] | Tone[1] | Penetration | Evenness | Feel | Sharpness |
|---|---|---|---|---|---|---|---|
| 1 | A | 100%[2] | [2] | [2] | [2] | [2] | [2] |
| 2 invention | B | 105% | Almost the same | Slightly - distinctly more | Almost the same | slightly better | Slightly - distinctly better |
| 3 | C | Almost the same | Almost the same | Distinctly more | Almost the same | Slightly - distinctly worse | Distinctly - considerably better |
| 4 | D | Almost the same | Almost the same | Trace - slightly more | Almost the same | Slightly worse | Slightly - distinctly better |

[1] = Colorimetric measurement
[2] = Comparison

The specialist terms used in the Tables are known to the expert on cellulose and textile printing and do not require any further explanation, cf. the chapters entitled "Textildruck (Textile Printing)" and "Textilfärberei (Textile Dyeing)" in Ullmanns Encyclopädie der Technischen Chemie, Vol. 22, pages 565 et seq. and pages et seq. (Verlag Chemie, Weinheim, 1982).

The superiority of the sulfoethyl cellulose derivative according to the invention (particularly CMSEC) used in textile printing is clearly apparent from the following Table of values. In addition to electrolyte and pH stability known from the literature (see, for example, U.S. Pat. No. 2,811,519, EP 0 319 865 A2 and J6 2-301A), the cellulose derivative according to the invention has the advantages shown in Table 3.

TABLE 3

Exemplary comparison between conventional thickeners used in textile printing and the cellulose ether according to the invention

| Parameter | Alginate (Protan) | CMSEC (Invention) | CMC (Comp. Ex.) |
|---|---|---|---|
| 1. Preservation (formaldehyde) | Absolutely essential | Not necessary | Not necessary |
| 2. Shear stability | Good | Good | Good |
| 3. Evenness of dyeing | Good | Good | Good |
| 4. Sharpness of dyeing | Good | Very good | Very good |
| 5. Feel of printed substrate (removability by washing) | Very good | excellent | Poor |
| 6. Penetration of the substrate | Good | Good | Good |
| 7. Tone | Good | Good | Good |
| 8. Reproducibility | Poor | Good | Good |

We claim:

1. In the printing of a textile wherein there is applied to such textile a printing composition, the improvement which comprises including in said composition a thickening amount of a carboxymethyl sulfoethyl cellulose (CMSEC) having a total degree of substitution of >1.0 and a degree of substitution by sulfoethyl groups of <0.4.

2. The method according to claim 1, wherein there is also included in said composition at least one member selected from the group consisting of sodium alginate, starch, modified starch, guar, carob bean flour, gum arabic, starch gum, tragacanth gum, tamarind and a cellulose ether.

3. The method according to claim 1, wherein carboxymethyl cellulose is also included in said composition.

4. The method according to claim 1, wherein the textile comprises fibers of at least one member selected from the group consisting of synthetic fibers, natural fibers, blended fabrics and regenerated cellulose.

5. The method according to claim 1, wherein the printing composition includes a dye selected from the group consisting of an oxidation dye, sulfur dye, development dye, wool dye, chrome dye, direct dye, acid dye, dispersion dye, naphthol dye, vat dye, metal complex dye, anionic dye, substantive dye, a pigment and the product of a mixture of a coupling component of a development dye and a diazoamino compound.

6. The method according to claim 1, wherein the printing composition includes a reactive dye.

7. The method according to claim 1, wherein the purified CMSEC has a viscosity of 10 to 50,000 mPa.s (as measured on a 2% by weight aqueous solution at a shear rate D of 2.5 $s^{-1}$ at 20° C. (rotational viscosimeter) and transmission values of more than 95% (as measured on a 2% by weight aqueous solution in a cuvette with an optical path length of 10 mm using light having a wavelength of 550 nm) and a solubility in water of $\geq 98\%$.

8. The method according to claim 1, wherein the CMSEC is produced by reacting alkali cellulose with reagents transferring sulfoethyl groups and carboxymethyl groups by a slurry method, the etherification reagents being reacted together or one after the other and the reagents transferring sulfoethyl groups being introduced into the slurry medium before the alkali.

9. The method according to claim 8, wherein the quantity of slurry medium is optionally reduced in a second step and the carboxymethyl, sulfoethyl or carboxymethyl sulfoethyl cellulose prepared in the first reaction step is adjusted without purification to the total degrees of substitution by addition of more etherification reagents.

* * * * *